April 24, 1956
G. H. WRIGHT
2,743,431
CONDITION INDICATORS FOR LIGHTING
SYSTEMS OF TRUCKS AND TRAILERS
Filed Feb. 14, 1951
2 Sheets-Sheet 1
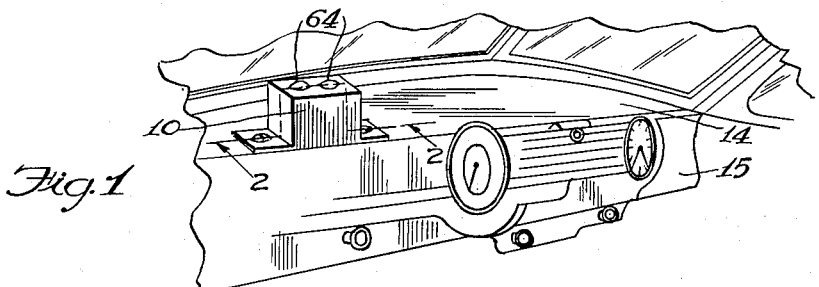
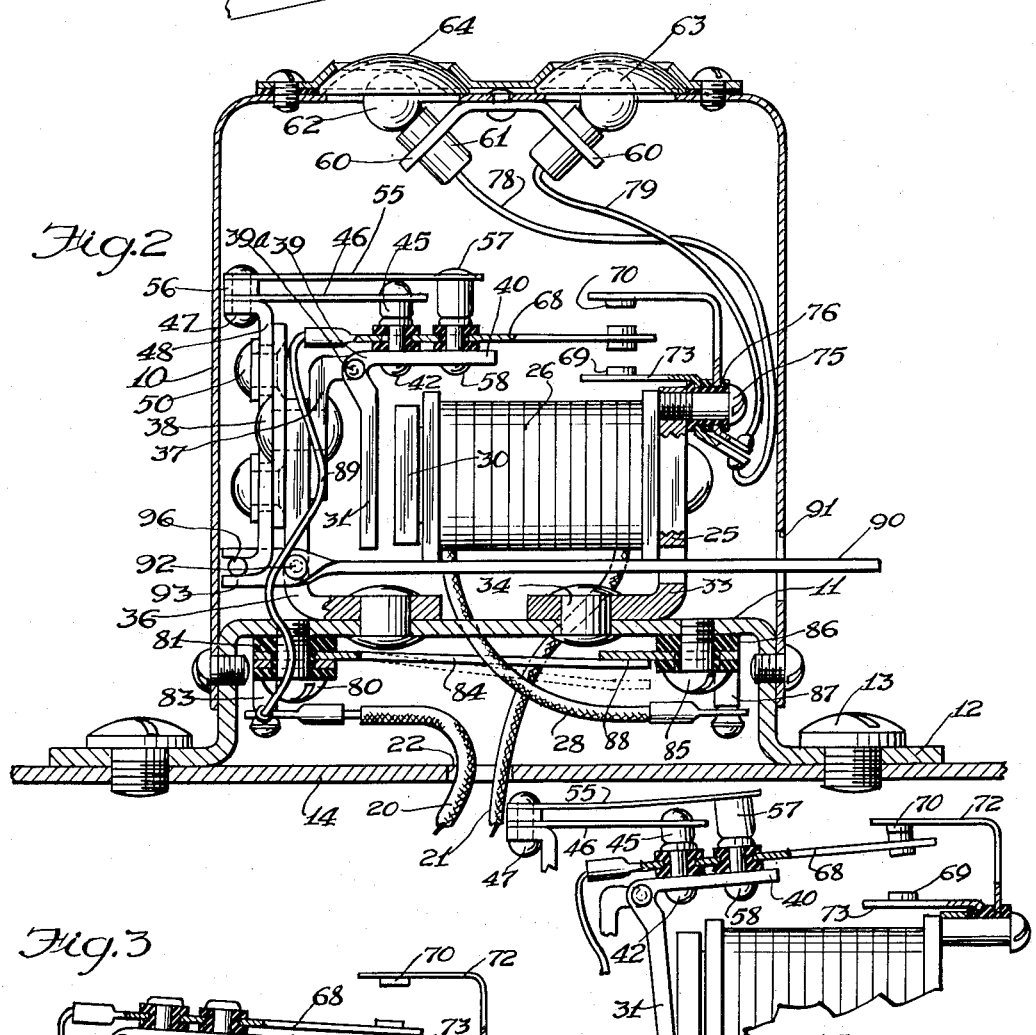
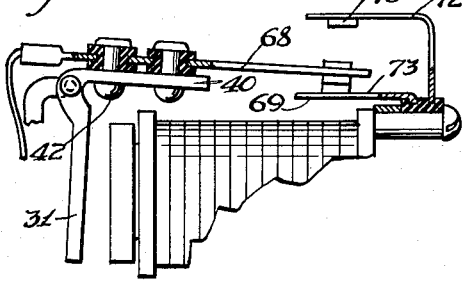
INVENTOR.
Glenn H. Wright
BY
Miles B. Stevens & Co.
Attorneys.

April 24, 1956  G. H. WRIGHT  2,743,431
CONDITION INDICATORS FOR LIGHTING
SYSTEMS OF TRUCKS AND TRAILERS Filed Feb. 14, 1951  2 Sheets-Sheet 2

INVENTOR.
Glenn H. Wright
BY
Milo B. Stevens & Co.
Attorneys.

United States Patent Office 2,743,431
Patented Apr. 24, 1956

2,743,431

CONDITION INDICATORS FOR LIGHTING SYSTEMS OF TRUCKS AND TRAILERS

Glenn H. Wright, Aurora, Ill.

Application February 14, 1951, Serial No. 210,924

5 Claims. (Cl. 340—220)

My invention relates to the electric lighting systems of motor trucks and trailers, and more particularly to means for indicating the operation or condition thereof to the driver. Lighting systems of the type mentioned have reached a high degree of development in recent years because of the growing popularity of motor truck and trailer transportation. In order that such transportation might have a high factor of safety, regulations were made requiring a sufficient number and suitable arrangement of lights on the truck or trailer to serve as indications to highway traffic. However, the development of an adequate lighting system carried with it the factor of error or failure to a greater or lesser extent. In other words, one or more of the lights is apt to go out, or a short of a minor or dangerous character can develop without warning to the driver, depriving the vehicle of the prescribed or proper indicating means, and therefore creating a traffic hazard, not to speak of a fire hazard in case wiring in the lighting system becomes shorted. It is virtually impossible for the driver under present conditions to be aware that any contingency of the type mentioned has occurred, and the failure may continue for some time before his attention would be drawn to it, and the fault corrected, since there is no medium on the market—to the best of my information—which may indicate to the driver while he is seated in the cab of his truck that anything wrong has developed in the lighting system of the vehicle.

In view of the above conditions, it is one object of the present invention to provide a unit in handy view of the driver while he occupies the cab which immediately indicates to him the development of any fault in the lighting system.

A further object is to so design and place the novel indicating unit that the driver is not required to interrupt his view of the road in order to learn the nature of the indication given by the unit.

A still further object is to construct the novel unit in the form of a small and compact unit designed for mounting on the dashboard of the vehicle in front of the driver's position, such unit containing signal lights which operate to indicate the failure of one or more lights on the truck or trailer, or the development of a minor short in the lighting system.

An additional object is to include in the novel indicating unit an automatic circuit breaker which operates in case a major short develops in the lighting system, preventing such short from creating a fire hazard.

Another object is to include a novel control within the unit which may in simple form serve all the requirements of the unit by utilizing the amperage factor in the circuit of the lighting system under different fault conditions thereof.

An important object is to construct the novel unit with few and simple parts in order that the same may be economically produced.

With the above objects in view, and any others which may suggest themselves from the description to follow, a better understanding of the invention may be had by reference to the accompanying drawing, in which—

Fig. 1 is a perspective view of a portion of the dashboard of the vehicle employing the novel indicating unit, showing the same mounted for operation;

Fig. 2 is an enlarged internal elevation of the unit, showing its parts in the normal or non-indicating position; and Figs. 3 and 4 are fragmental duplications of parts in Fig. 2 showing changes of position resulting from different conditions in the operation of the lighting system;

Figure 5:
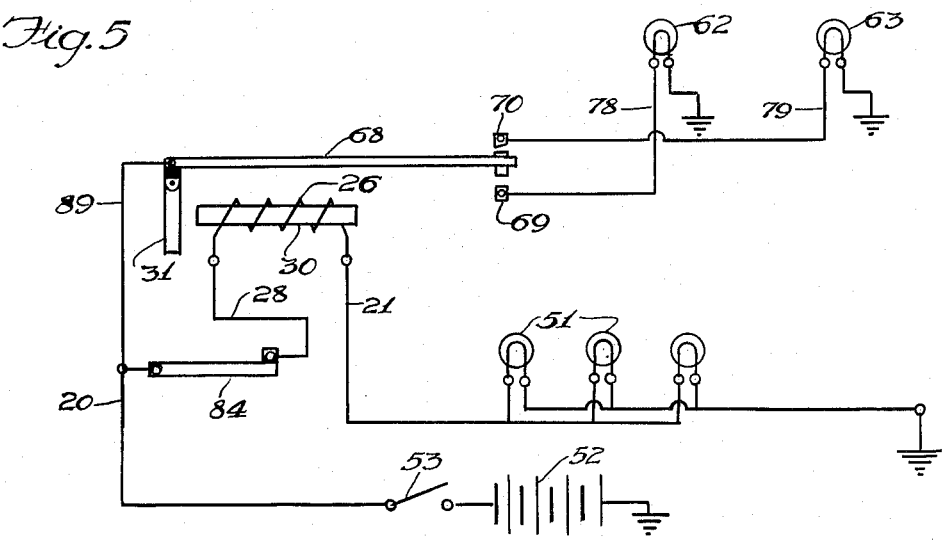
Figs. 5, 6 and 7 are diagrammatic views of the electrical circuit of the indicator as affected by the said conditions.

In accordance with the foregoing, specific reference to the drawing indicates the housing of the unit at 10; and the same contains a base 11 in the lower portion formed with feet 12 suitable for the application of screws 13 or other suitable fastening means to secure the unit to the top 14 of the vehicle dashboard 15.

The base 11 is designed as the main support for the instrumentalities contained in the housing 10; and the connection of the lighting system with the indicating unit is represented by the introduction of leads 20 and 21 representing the main wires of the lighting system, such leads passing through an opening 22 in the dashboard top 14 or in some other convenient way to enter the lower portion of the housing 10.

The main element contained in the housing 10 comprises an electromagnet 25 whose winding is initiated by the lead 21 of the lighting system to form a coil 26; and the end of the winding opposite from the lead 21 leaves the magnet in the form of a conductor 28. The core of the electromagnet is indicated at 30; and an armature 31 is designed to operate in respect to such core.

The normal position of the armature 31 is in pendent spaced relation to the core 30, as shown in Fig. 2. The magnet is supported over the base 11 by a bracket 33 secured to the base by a heavy rivet 34, while the armature 31 is supported on the base by a companion bracket 36 to which an arm 37 is secured by a heavy rivet 38. The armature 31 is formed with a bend 39 which is horizontally pivoted to the arm 37 at 39a to suspend the armature for movement from and toward the magnet core 30.

A peculiar control is provided to determine the position of the armature 31 in relation to the core 30 under different conditions, and certain features of such control are of a mechanical nature. Thus, the armature 31 continues beyond the bend 39 with a horizontal arm 40. This arm contains a rivet 42 which is subject to slight downward pressure from a hammer 45 carried by one end of a leaf spring 46, the other end of the latter being secured by a rivet 47 to an arm 48 attached to the base bracket 36 by means of a rivet 50. The leaf spring 46 is tensioned to apply a suitable amount of pressure by way of the hammer 45 on the rivet 42 to maintain the armature 31 in the normally spaced position shown in Fig. 2. This condition prevails as long as the current passing from the lighting system around the electromagnet is at a working amperage. In other words, what attraction there may be in the magnet for the armature 31 under this condition is balanced or offset by the pressure of the hammer 45 to maintain the armature in the position stated.

In case one or more lights in the vehicle lighting system fail, the first manifestation of such failure is a drop in the amperage of the circuit. This condition is reflected in a weakening of the magnetic attraction for the armature 31, to which the leaf spring 46 responds by augmenting its pressure on the armature arm 40 and procuring the corresponding withdrawal or separation of the armature 31 from the magnet. The desired result of this movement is the downward deflection of the armature arm 40, as shown in Fig. 3.

In case a minor short occurs in the lighting circuit, the first manifestation will be an increase in its amperage. This action will increase the attraction of the armature 31 to the magnet, drawing the armature into contact with the core 30, as shown in Fig. 4. This action, while partly tending to relax the leaf spring 46, is actually resisted by a companion and relatively stronger leaf spring 55 above the leaf spring 46 and secured by the same rivet 47 with the use of a spacer 56 between the springs, the leaf spring 55 terminating with a hammer 57 beyond the end of the leaf spring 46, and bearing on the arm 40 through the agency of a rivet 58. Thus, the leaf spring 55, which is normally relaxed, is tensioned by the attracting movement of the armature 31, as just described; and, the desired result of the movement is to impart a rising slope to the arm 40, as shown in Fig. 4.

The housing 10 has a frame 60 in the top portion carrying sockets 61 for an amber light bulb 62 and a red light bulb 63, respectively, the light bulb arrangement being surmounted by convex lenses 64 designed to be in the direct view of the vehicle driver. Electrical connections are made in the housing to operate the bulbs 62 and 63 through the agency of a switch 68 carried by the armature arm 40. The switch is designed to meet a contact post 69 on the depression of the arm 40 as first stated, and to meet an opposed contact 70 when the arm 40 rises, as later described. The contacts 69 and 70 are carried by arms 72 and 73 which are supported on the base bracket 25 through the agency of a bolt 75 and an insulator 76, so that conductors 78 and 79 may be led from the contacts 69 and 70 to one of the terminals of the light bulbs 62 and 63, respectively, the other terminals thereof being grounded to the housing. It follows, therefore, that a failure of one or more of the lights on the vehicle lighting system actuates the amber light bulb 62, while the development of a minor short actuates the red light bulb 63.

The wiring from the vehicle lighting system is completed as follows. A bolt 80 near one end of the base 11 secures an insulator 81 to the same, the insulator carrying a connector 83 for the lead 20 and one end of a bi-metal blade 84. A companion bolt 85 and insulator 86 are applied near the opposite end of the base, the insulator carrying a connector 87 for the lead 28 and a keeper 88, the bi-metal blade 84 being tensioned to normally engage the keeper, as shown in Fig. 2. A branch conductor 89 leads from the connector 83 to the switch 68. The light bulbs 62 and 63 are now in the vehicle lighting circuit; and the bi-metal blade 84 is interposed in the line thereof formed by the lead 20, connector 83, blade 84, keeper 88, connector 87 and conductor 28. Now, in case of a major short in the vehicle lighting system, the blade 84 will periodically break the circuit, and the armature 31 will be attracted to the electromagnet in alternation, these manifestations being brought to the attention of the driver by the blinking action of the red light bulb 63.

Figure 6:
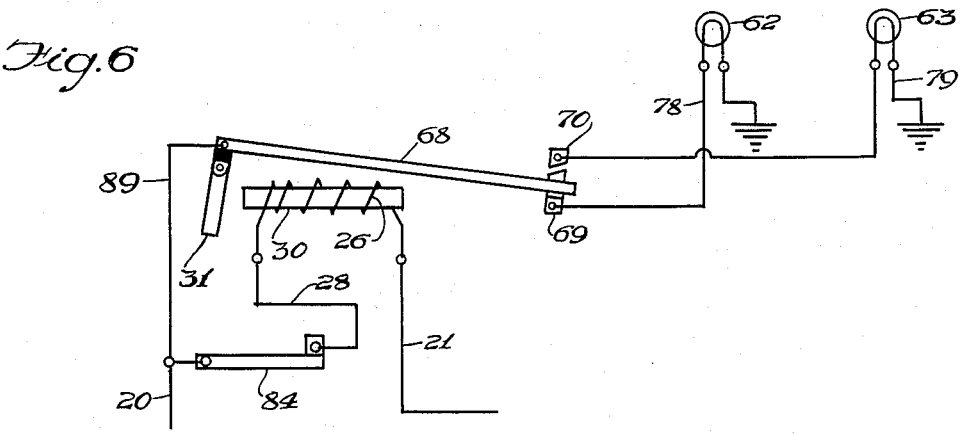
Figure 7:
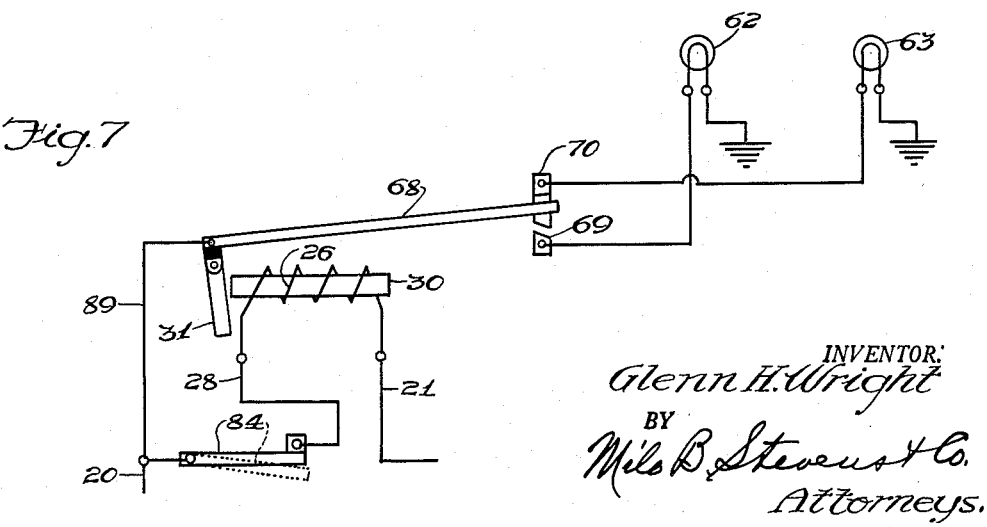

The diagram of Fig. 5 shows the lights 51, battery 52 and switch 53 incident to a conventional vehicle lighting system forming the source for the current leads 20 and 21, and it is apparent that the neutral position of the switch 68 during the normal operation of the system cuts off the light bulbs 62 and 63, so that no signal is given by the indicator. Fig. 6 shows the switch in contact with the terminal 69 and the amber light bulb 62 actuated, while Fig. 7 shows the switch engaging the terminal 70, actuating the red light bulb 63. Dotted lines in Fig. 7 indicate the intermittent action of the bi-metal blade 84 in the event of a major short, in which event a corresponding effect is had on the electro-magnet and blade 68 resulting in the blinking or flashing action of the red light bulb 63.

It is now understood that the amount of tension in the leaf spring 46 determines the degree of retraction of the armature 31 in the event that a light failure develops and the lighting circuit amperage falls. However, as far as described, the indicating unit only signals the failure of one or more lights so affected. It stands to reason that the more lights fail, the lower the lighting circuit amperage will fall, permitting the armature 31 to be retracted further. This is done by imparting greater tension to the control blade 46, and may be handily determined by the driver. Thus, the arm 37 is slidable vertically in relation to the bracket 36 and connected to the arm 48 by the rivet 38 in a manner to make both arms 37 and 48 slidable vertically as a unit. This motion is procured manually by actuating a lever 90 whose outer end passes through an opening 91 in the housing for easy access to the driver. The inner portion of the lever 90 is pivoted at 92 to the base bracket 36 and extended beyond the pivot with a fork 93 which receives a cross-bar 96 formed at the bottom of the arm 48. It is thus possible to raise and lower the control blades 46 and 55 and therefore determine substantially the extent of the failure or minor short in the wiring circuit.

It will now be apparent that the novel indicating unit has a number of advantageous features. First, it accomplishes its necessary functions in the two light bulbs 62 and 63, making it possible to construct the unit compactly, and requiring no special concentration on the part of the driver. Further, a mechanism is provided which lends itself to characteristics in the amperage of a lighting circuit to indicate routine failures or disabilities, and even the presence of a hazardous condition. The instrumentalities for this purpose are largely mechanical, and there is very little wiring in the housing of the unit, precluding the chances of disorders in the same due to electrical failures. Further, the control for a serious short is of the well established thermostatic type, the same not only breaking the circuit, but procuring a flashing action as a repeating tell-tale to the driver that a serious failure has occurred and as a warning that he should stop at the nearest station to investigate. Finally, the novel unit contains parts of a rugged character, and only the number thereof actually needed to accomplish the function of the unit, so that the same may be produced economically.

While I have described the invention along specific lines, various minor changes or refinements may be made therein without departing from its principle, and I reserve the right to employ all such changes and refinements as may come within the scope and spirit of the appended claims.

I claim:

1. An indicator for the lighting circuit of a motor vehicle comprising a unit situated in the driver's compartment, such unit receiving the leads from said circuit, a signal light carried by the unit in a position of direct view by the driver, means in said unit in circuit with said leads and effective to actuate said signal light when the amperage of the lighting circuit rises as the result of a minor short therein, a flashing device also in said circuit and adjusted to remain unresponsive to increases in amperage in said lighting circuit resulting from minor shorts but effective to respond to heavier currents in said lighting circuit induced by major shorts.

2. An indicator for the lighting circuit of a motor vehicle comprising a unit situated in the driver's compartment such unit receiving the leads from said circuit, visual signal light means effective when operated in different permutations of illumination to define lamp failure, minor-short and major-short circuit conditions, a single electromagnet winding in circuit with said leads and responsive to indicate said lamp failure and minor-short condition, and a thermal flasher permanently in circuit with said winding, such flasher being unresponsive to said lamp failure and minor-short condition but effective on said major-short condition to actuate said signal light means as an indication of such major-short condition.

3. An indicator for the lighting circuit of a motor vehicle comprising a unit situated in the driver's compartment such unit receiving the leads from said circuit, signal light means carried by the unit in a position of direct view by the driver, and an electromagnet in said unit in circuit with said leads and effective to actuate said light means to have the latter indicate to the driver lamp failure, minor-short and major-short conditions in said lighting circuit, and a single armature for said electromagnet and adapted to actuate said signal light means selectively as an indication of any one of said conditions, said signal light means comprising a pair of indicating lamps, contact means in circuit with the latter and effective when said armature is in one position to illuminate one of said indicating lamps when a lamp failure condition occurs, and effective when said armature is in another position to indicate a minor-short condition, and additional means in series with said electromagnet and effective to intermittently operate one of said lamps when a major-short condition occurs.

4. An indicator for the lighting circuit of a motor vehicle comprising a unit situated in the driver's compartment and receiving the leads from said circuit, visual signal means indicative of a failure of lamps in said lighting circuit, a single electromagnet winding in circuit with said leads and responsive to said light failure, an armature responsive to said winding and effective to actuate said signal means in such event, and a control operable to affect the response of said armature in a direction to neutralize said failure, the extent of operation of said control being an indication of the number of lamps involved in said failure.

5. An indicator for the lighting circuit of a motor vehicle comprising a unit situated in the driver's compartment and receiving the leads from said circuit, visual signal means indicative of a failure of lamps in said lighting circuit, a single electromagnet winding in circuit with said leads and responsive to said light failure, an armature responsive to said winding and effective to actuate said signal means in such event, tension means influenced by the position of said armature, and a control operable to affect the response of said armature by adjustment of said tension means and in a direction to neutralize said failure, the extent of operation of said control being an indication of the number of lamps involved in said failure.

References Cited in the file of this patent
UNITED STATES PATENTS

| | | |
|---|---|---|
| 1,138,988 | Sohm | May 11, 1915 |
| 1,229,939 | Goldstein | June 12, 1917 |
| 1,788,597 | Schultz | Jan. 13, 1931 |
| 2,171,152 | Very | Aug. 29, 1939 |
| 2,270,587 | Hall | Jan. 20, 1942 |
| 2,360,288 | Stevens | Oct. 10, 1944 |
| 2,409,018 | Corey | Oct. 8, 1946 |
| 2,414,932 | Crockett | Jan. 28, 1947 |
| 2,450,450 | Schmidinger | Oct. 5, 1948 |
| 2,486,599 | Hollins | Nov. 1, 1949 |
| 2,511,631 | Gordon | June 13, 1950 |
| 2,646,556 | Allen | July 21, 1953 |